US011455307B2

(12) United States Patent
Hertzschuch et al.

(10) Patent No.: US 11,455,307 B2
(45) Date of Patent: Sep. 27, 2022

(54) WORKLOAD-BASED SAMPLING

(71) Applicant: SAP SE, Walldorf (DE)

(72) Inventors: Axel Hertzschuch, Dresden (DE); Norman May, Karlsruhe (DE); Lars Fricke, Graben-Neudorf (DE); Florian Wolf, Heidelberg (DE); Guido Moerkotte, Mannheim (DE); Wolfgang Lehner, Dresden (DE)

(73) Assignee: SAP SE, Walldorf (DE)

( * ) Notice: Subject to any disclaimer, the term of this patent is extended or adjusted under 35 U.S.C. 154(b) by 329 days.

(21) Appl. No.: 16/797,106

(22) Filed: Feb. 21, 2020

(65) Prior Publication Data
US 2021/0263935 A1 Aug. 26, 2021

(51) Int. Cl.
*G06F 16/2453* (2019.01)
*G06N 7/00* (2006.01)

(52) U.S. Cl.
CPC ....... *G06F 16/24549* (2019.01); *G06N 7/005* (2013.01)

(58) Field of Classification Search
CPC ................ G06F 16/24549; G06N 7/005
See application file for complete search history.

(56) References Cited

U.S. PATENT DOCUMENTS

| | | | |
|---|---|---|---|
| 2008/0086444 A1* | 4/2008 | Yu | G06F 16/2455 |
| 2008/0306903 A1* | 12/2008 | Larson | G06F 16/2462 |
| 2014/0181078 A1* | 6/2014 | Ghazal | G06F 16/24542 707/718 |
| 2018/0341678 A1* | 11/2018 | Moerkotte | G06F 16/24545 |

* cited by examiner

*Primary Examiner* — Kris E Mackes
(74) *Attorney, Agent, or Firm* — Buckley, Maschoff & Talwalkar LLC

(57) ABSTRACT

A system includes determination of a plurality of queries of a workload, determination of a data source comprising a plurality of data rows, and determination of a sample data source based on a cardinality of each of the plurality of queries with respect to the data source and an estimated cardinality of each of the plurality of queries with respect to the data source, wherein the estimated cardinality of a query with respect to the data source is determined based on the sample data source.

15 Claims, 8 Drawing Sheets

| | |
|---|---|
| Row0 | 0 |
| Row1 | - |
| Row2 | - |
| Row3 | 0 |
| Row4 | - |
| Row5 | 0 |
| Row6 | - |
| Row7 | - |
| Row8 | - |
| Row9 | - |

*FIG. 7*

QUERY2 — 810 → [table 420 with Row0–Row9] → 830 Row0, Row2

*FIG. 8*

| | | | | | | |
|---|---|---|---|---|---|---|
| Row0 | | | | | | |
| RowNULL | | | | | | |
| RowNULL | | | | | | |
| RowNULL | | | | | | |
| RowNULL | | | | | | |

FIG. 13
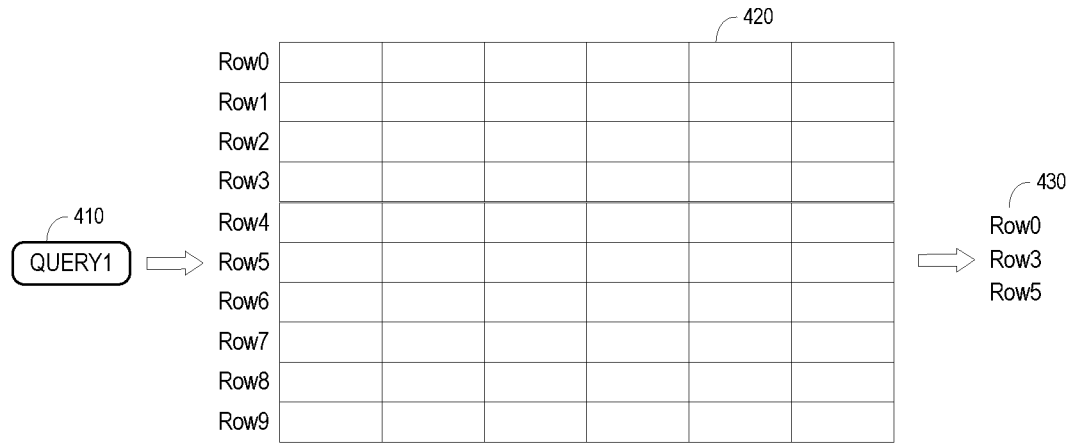
FIG. 14
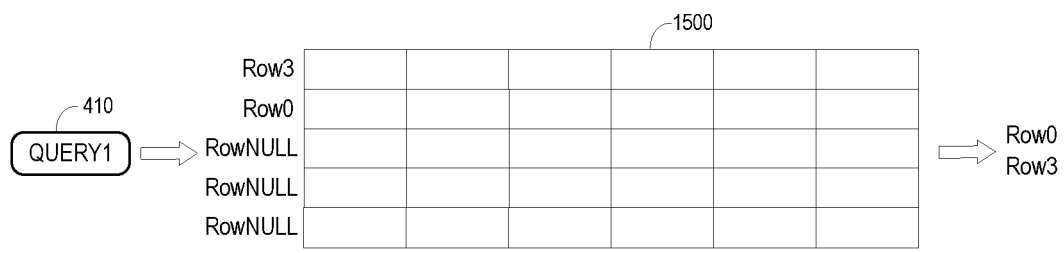
FIG. 15

WORKLOAD-BASED SAMPLING

BACKGROUND

Modern database systems receive database queries from applications. The database queries specify particular data of one or more data sources. A database system determines a query execution plan based on a received database query and executes the query execution plan against the data sources to generate a result set.

A database system typically includes a query optimizer which selects one of several possible query execution plans for executing a query. For example, the query optimizer may determine an estimated cost of each of the several query execution plans and select a query execution plan associated with a smallest cost. The estimated costs may be determined in part based on database statistics. One such statistic is the estimated selectivity of the predicates of the received query.

Selectivity refers to a percentage of records of a table which are selected by the query predicates. Cardinality is determined by multiplying the selectivity by the number of records in the table. In order to estimate the selectivity/cardinality of particular query predicates for table R, the query may be executed against a random sampling of the records of table R. However, if R is large and the selectivities of the predicates are low, the quality of this estimate is often insufficient.

Inaccurate estimated selectivities may result in inacurate determinations of execution plan costs, and may therefore result in selection of a less-desirable query execution plan. Systems are desired to improve selectivity estimates.

BRIEF DESCRIPTION OF THE DRAWINGS

FIG. 7 illustrates a vector of weights associated with table rows according to some embodiments.

FIG. 8 illustrates execution of a second query of the workload on a database table according to some embodiments.

FIG. 9 illustrates a candidate sample according to some embodiments.

FIG. 13 illustrates an initialized vector of weights associated with table rows according to some embodiments.

FIG. 14 illustrates execution of the query on the database table according to some embodiments.

FIG. 15 illustrates execution of the query on a candidate sample according to some embodiments.

DETAILED DESCRIPTION

The following description is provided to enable any person in the art to make and use the described embodiments and sets forth the best mode contemplated for carrying out some embodiments. Various modifications, however, will be readily-apparent to those in the art.

Figure 1:
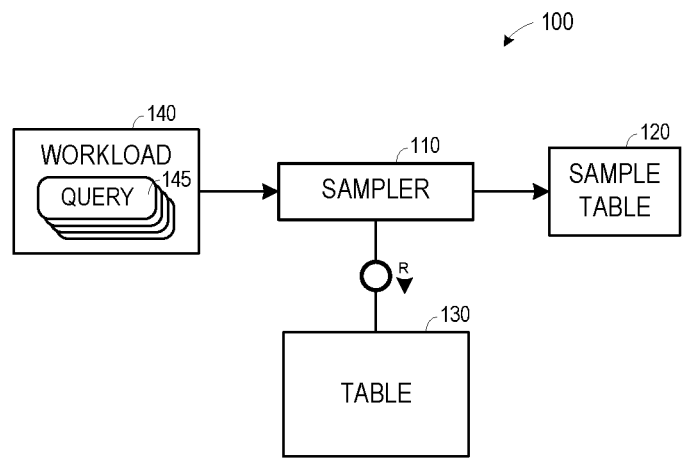
FIG. 1 is a block diagram of a system to generate a sample table according to some embodiments.

FIG. 1 is a block diagram of system 100 according to some embodiments. The illustrated elements of system 100 may be implemented using any suitable combination of computing hardware and/or software that is or becomes known. In some embodiments, two or more elements of system 100 are implemented by a single computing device. One or more elements of system 100 may be implemented as a cloud service (e.g., Software-as-a-Service, Platform-as-a-Service).

As shown, sampler 110 generates sample table 120 including a subset of records of table 130. Sampler 110 generates sample table 120 based on queries 145 of workload 140. According to some embodiments, sample table 120 is generated such that the selectivity of queries 145 on sample table 120 is similar to the selectivity of queries 145 on table 130. As a result, selectivity statistics for table 130 which are generated based on sample table 120 may be more accurate than selectivity statistics generated based on a random or other type of sample of table 130.

According to some embodiments, sampler 110 generates sample table 120 by determining, for each of queries 145, the extent to which the addition of a particular row of table 130 to sample table 120 will decrease an error in a cardinality estimation for the query which is based on the sample table 120. The particular rows evaluated for each query may include only those rows of table 130 which are selected by the predicates of the query. Sample table 120 may therefore consist of the rows of table 130 which result in the largest overall decrease in estimation error for queries 145 of workload 140.

In some embodiments, queries 145 of workload 140 are similar to future queries which are expected to be received on table 130. The use of sample table 120 to estimate selectivities of the future queries may result in more-accurate determinations of query execution plan costs and, as a result, improved selection of query execution plans for the future queries.

Figure 2:
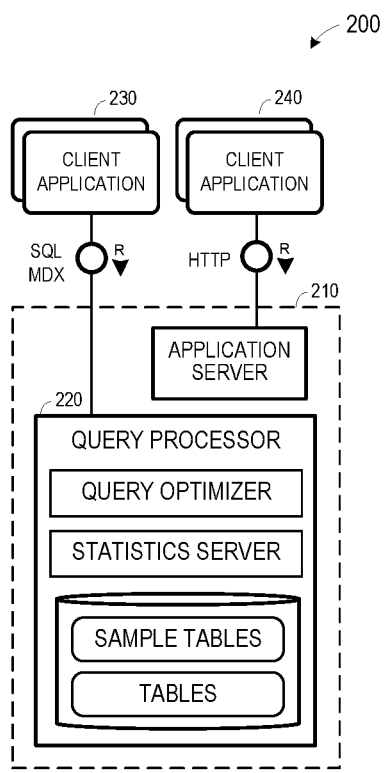
FIG. 2 is a block diagram of a database system according to some embodiments.

FIG. 2 is a block diagram of a distributed architecture which may generate and/or employ such sample tables according to some embodiments. Embodiments are not limited to the FIG. 2 architecture.

Generally, server node 200 receives a query from client applications 230 and 240 and returns results thereto based on data stored within node 200. Node 200 executes program code to provide an application server and query processor 220. The application server provides services for executing server applications. For example, Web applications executing on an application server may receive HyperText Transfer Protocol (HTTP) requests from client applications 240 as shown in FIG. 2.

Query processor 220 contains the actual stored data and engines for processing the data. Query processor 220 is responsible for processing Structured Query Language (SQL) and Multi-Dimensional eXpression (MDX) statements and may receive such statements directly from client applications 230.

Query processor 220 includes a query optimizer for use in determining query execution plans and a statistics server for determining statistics for estimating query execution plan costs. The statistics server may generate such statistics based on stored sample tables which are generated as described herein. For example, in response to reception of a query on a stored table of server node 200, the statistics server may estimate selectivity of the query on the table based on a pre-generated and stored sample table which corresponds to the table. According to some embodiments, the query optimizer of query processor 220 comprises an implementation of sampler 110 to generate such sample tables.

In some embodiments, the data of server node 200 may comprise one or more of conventional tabular data, row-based data, column-based data, and object-based data. Moreover, the data may be indexed and/or selectively replicated in an index to allow fast searching and retrieval thereof. Server node 200 may support multi-tenancy to separately support multiple unrelated clients by providing multiple logical database systems which are programmatically isolated from one another.

Server nodes 200 may implement an "in-memory" database, in which a full database stored in volatile (e.g., non-disk-based) memory (e.g., Random Access Memory). The full database may be persisted in and/or backed up to fixed disks (not shown). Embodiments are not limited to an in-memory implementation. For example, data may be stored in Random Access Memory (e.g., cache memory for storing recently-used data) and one or more fixed disks (e.g., persistent memory for storing their respective portions of the full database).

Figure 3A:
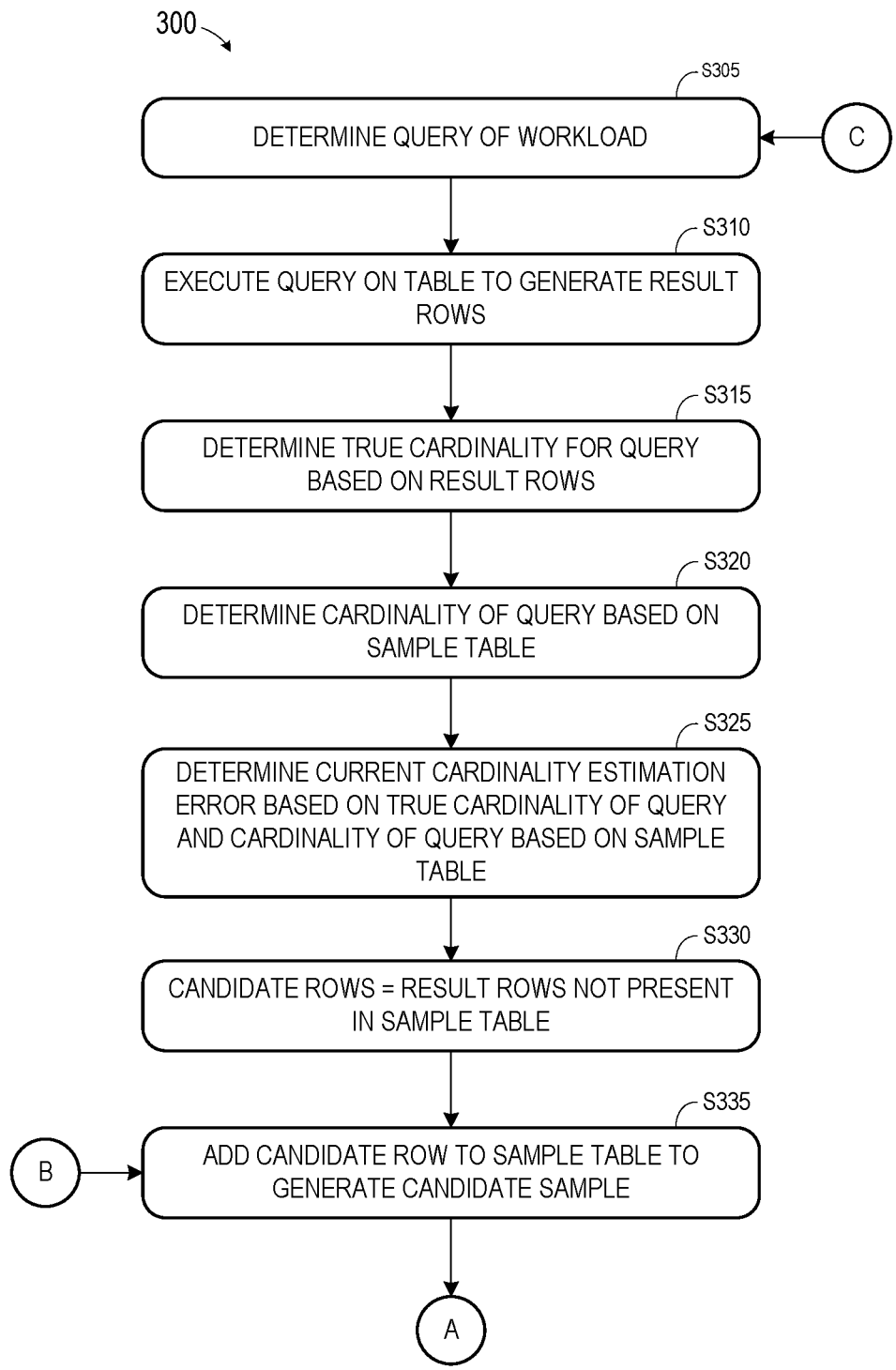
FIGS. 3A and 3B comprise a flow diagram to generate a sample table according to some embodiments.
Figure 3B:
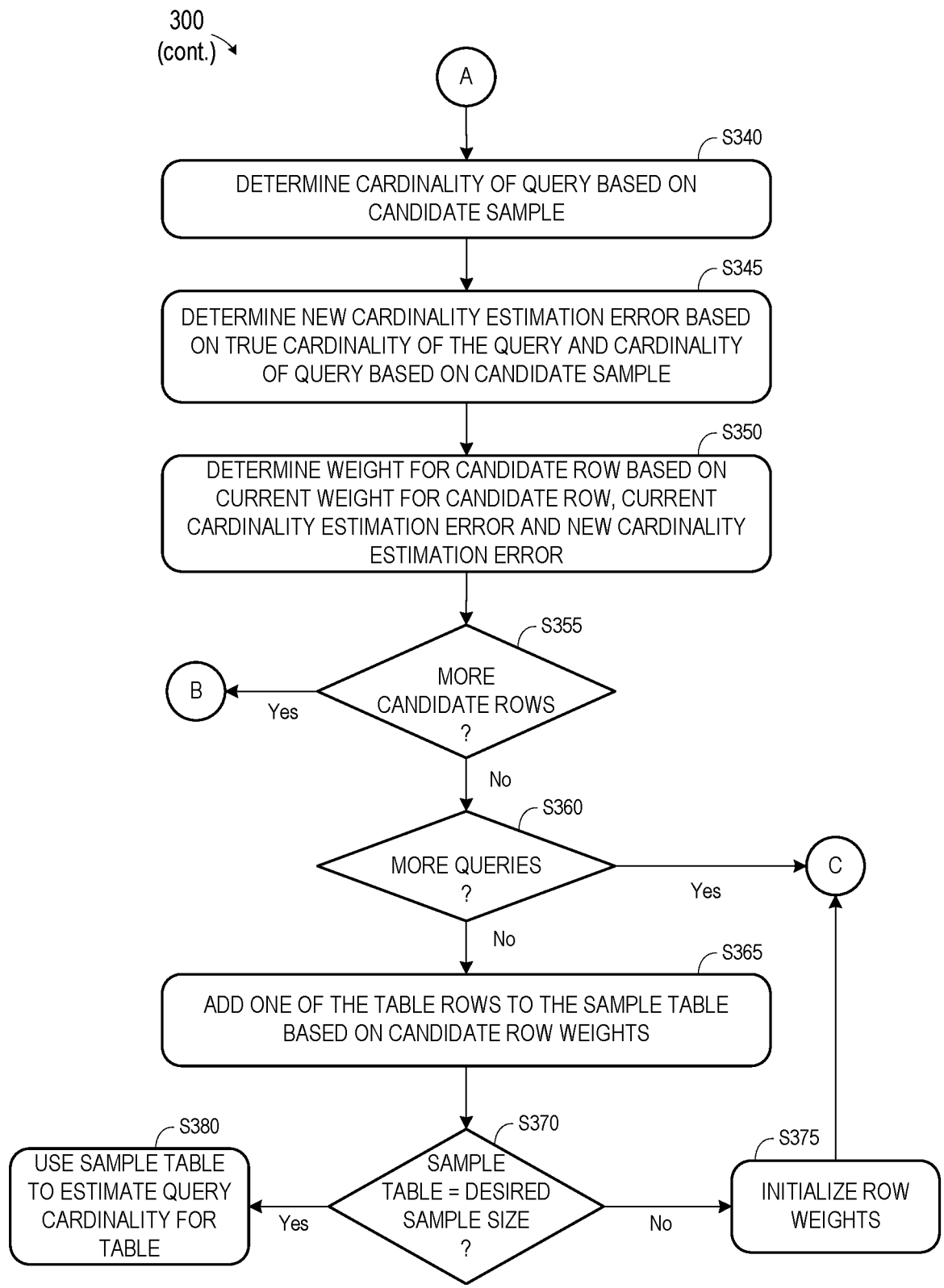

FIGS. 3A and 3B comprise a flow diagram of process 300 according to some embodiments. In some embodiments, various hardware elements of server node 200 execute program code to perform process 300. Process 300 and all other processes mentioned herein may be embodied in computer-executable program code read from one or more of non-transitory computer-readable media, such as a hard disk drive, a volatile or non-volatile random access memory, a DVD-ROM, a Flash drive, and a magnetic tape, and then stored in a compressed, uncompiled and/or encrypted format. In some embodiments, hard-wired circuitry may be used in place of, or in combination with, program code for implementation of processes according to some embodiments. Embodiments are therefore not limited to any specific combination of hardware and software.

Initially, a query of a workload is determined at S305. A workload may consist of thousands of queries, each of which may comprise one or more predicates which define the data rows to be affected by the query. A workload may comprise a set of typical and/or expected queries on a data source. Definition of a workload for a particular data source (e.g., table) may allow a database system to tune its operation to the tasks the database system will be expected to perform. In the present instance, and as mentioned above, the queries of the workload are used to generate a sample table which exhibits selectivities similar to those of the table to which the queries are directed.

Figure 4:
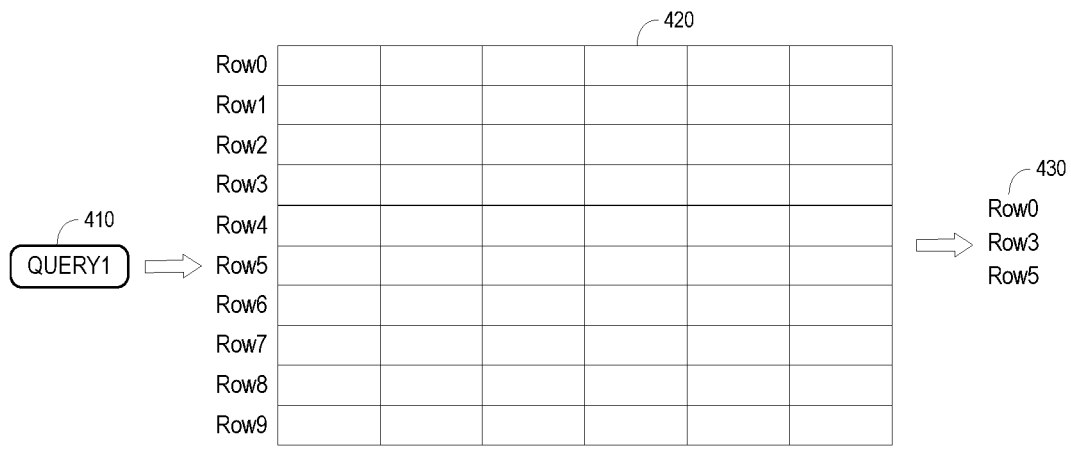
FIG. 4 illustrates execution of a query of a workload on a database table according to some embodiments.

The query determined at S305 is executed on the table to generate result rows at S310. S310 includes identifying the rows of the source table which satisfy the predicates of the determined query. FIG. 4 illustrates the application of query 410 determined at S305 to table 420 to identify result rows 430 according to the present example. Result rows 430 are identified by their row_id.

At S315, the true cardinality of the query with respect to the table is determined. In the present example, the true cardinality is three because query 410 selected three rows of table 420. Since table 420 includes ten rows, the true selectivity is 3/10=30%.

Figure 5:
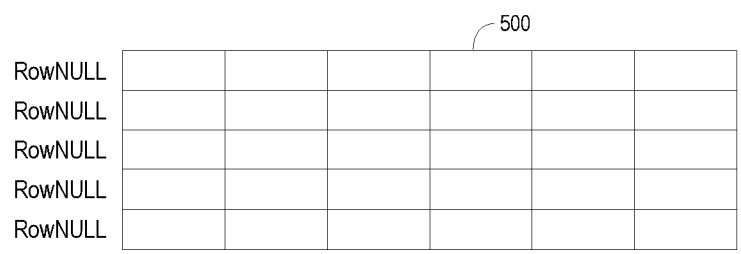
FIG. 5 illustrates a sample table according to some embodiments.

Next, at S320, the cardinality of the query with respect to the source table is determined based on a sample table. As will be understood from the foregoing description, process 300 operates to populate a sample table based on a source table (e.g., table 420). The sample table initially consists of a predetermined number of dummy rows based on a desired size of the sample table. FIG. 5 illustrates initial sample table 500 according to some embodiments, including five dummy rows corresponding to the desired size of the sample table.

Because sample table 500 is empty, no rows of sample table 500 are selected by the query. Accordingly, using the formula ((# of selected rows of sample table/# of rows of sample table rows)*# of rows of source table) to estimate the cardinality of the source table, the estimated cardinality is zero. However, in such a case, and in order to facilitate the present algorithm, embodiments may assume that one row of the sample table is selected, such that the estimated cardinality is ((1/# of rows of sample table rows)*# of rows of source table) or, in the present example, ((1/5)*10)=2.

A current cardinality estimation error is determined at S325 based on the true cardinality determined at S315 and the cardinality of the query with respect to the sample table determined at S320. S325 may implement any algorithm or system to determine a cardinality estimation error. According to some embodiments, the current cardinality estimation error is determined as a q-error:

$$QE_{curr} = \max\left(\frac{trueCardinality}{estimatedCardinality}, \frac{estimatedCardinality}{trueCardinality}\right),$$

where estimatedCardinality is cardinality of the query with respect to the sample table. According to the present example, $$QE_{curr} = \max\left(\frac{3}{2}, \frac{2}{3}\right) = \frac{3}{2}$$

Candidate rows are determined at S330 as those rows identified in S310 which are not currently members of the sample table. Since the sample table is currently empty as described above, all of rows 430 are identified at S330 as candidate rows. One of the candidate rows is added to the sample table at S335 to generate a candidate sample.

Figure 6:
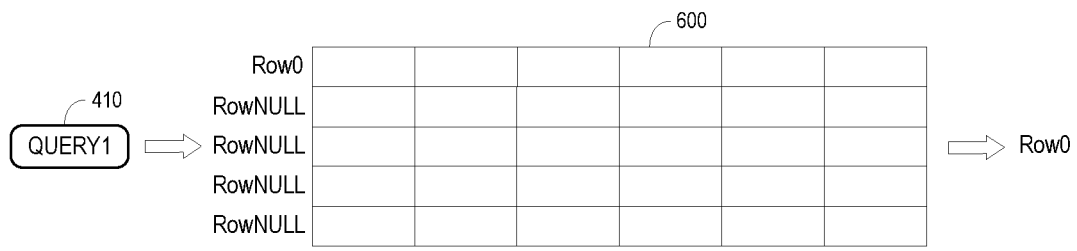
FIG. 6 illustrates execution of the query on a candidate sample according to some embodiments.

FIG. 6 illustrates candidate sample 600 according to the present example. Candidate sample 600 consists of Row0 of rows 430 (i.e., the candidate row added to the sample table at S335) and four other dummy rows, such that candidate sample 600 complies with the predetermined sample size of five rows.

Proceeding to S340, the cardinality of the current query is then determined based on the candidate sample table. FIG. 6 illustrates determination of the cardinality by applying query 410 to candidate sample table 500, causing selection of Row0. Therefore, the selectivity on candidate sample 600 is 1/5 and the estimated cardinality of source table 420 is 1/5*10 rows=2.

A new cardinality estimation error is determined at S345 based on the true cardinality determined at S315 and the cardinality of the query determined at S340 based on the candidate sample table. Using the above formula for q-error:

$$QE_{new} = \max\left(\frac{3}{2}, \frac{2}{3}\right) = \frac{3}{2}$$

Next, at S350, a weight for the current candidate row (i.e., Row0) is determined based on a current weight associated with the candidate row, the current cardinality estimation error and the new cardinality estimation error. According to some embodiments, Weight$_{row\_id}$=Weight$_{row\_id}$+QE$_{curr}$−QE$_{new}$ The weights are initially set to zero, so continuing with the present example:

$$Weight_0 = 0 + \frac{3}{2} - \frac{3}{2} = 0$$

At S355 it is determined whether other candidate rows were identified at S330 and not yet subjected to the processing of S335-S350. Accordingly, in the present example, the determination at S355 is affirmative and flow returns to S335 to substitute Row3 for one of the dummy rows of the sample table. Flow then continues as described above with respect to Row3 and, upon reaching S355, returns again to S335 to substitute Row5 for one of the dummy rows of the sample table. FIG. 7 illustrates a vector of weights determined at S350 for each of the candidate rows during this first iteration of the present example.

Flow proceeds from S355 to S360 once all the candidate rows determined based on the first query have been processed. At S360, it is determined whether the workload includes any additional queries. If so, flow returns to S305 to determine another query of the workload.

As described above, the next query determined at S305 is executed on the table to generate result rows at S310. FIG. 8 illustrates the application of next query 810 determined at S305 to table 420 to identify result rows 830 according to the present example.

The true cardinality of the query with respect to the table is determined at S315. In the FIG. 8 example, the true selectivity is 2/10=20% and the true cardinality is two. Next, at S320, the cardinality of the query is determined based on a sample table. At this point of process 300 the sample table is still empty and the cardinality is zero, but will be determined at S320 to be 2 as described above. A current cardinality estimation error is then determined at S325 based on the true cardinality determined at S315 and the cardinality of the query with respect to the sample table determined at S320. Using the q-error calculation set forth above, the current cardinality estimation error determined at S315 is 2/2=1.

Since the sample table is currently empty, all of rows 830 are identified at S330 as candidate rows. One of the candidate rows is added to the sample table at S335 to generate a candidate sample. FIG. 9 illustrates candidate sample 900 according to the present example.

Figures 10, 11, 12:
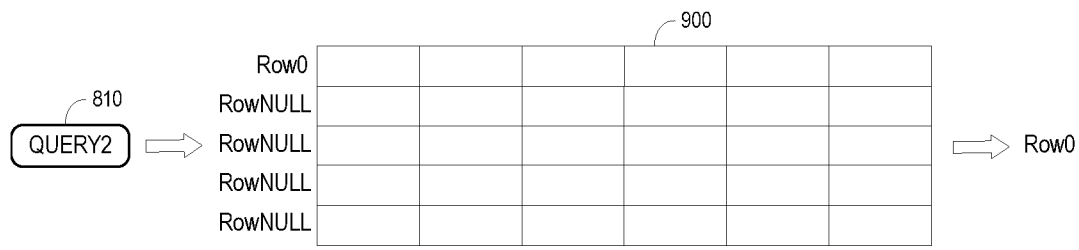
FIG. 10 illustrates execution of the second query on a candidate sample according to some embodiments.
FIG. 11 illustrates a vector of weights associated with table rows according to some embodiments.
FIG. 12 illustrates a sample table according to some embodiments.

The cardinality of the current query is determined at S340 based on the candidate sample. FIG. 10 illustrates determination of the cardinality by applying query 810 to candidate sample 900, causing selection of Row0. The selectivity on candidate sample 900 is 20% and the estimated cardinality of underlying table 420 is 20% of rows*10 rows=2.

A new cardinality estimation error is determined at S345 based on the true cardinality determined at S315 and the cardinality of the query determined at S340 based on the candidate sample. Using the above formula for q-error:

$$QE_{new} = \max\left(\frac{2}{2}, \frac{2}{2}\right) = \frac{2}{2} = 1$$

Next, at S350, a weight for the current candidate row (i.e., Row0) is determined based on a current weight associated with the candidate row, the current cardinality estimation error and the new cardinality estimation error. According to some embodiments, Weight$_{row\_id}$=Weight$_{row\_id}$+QE$_{curr}$−QE$_{new}$ The current weight associated with Row0 is 0 as described above, so continuing with the present example:

Weight$_0$=0+1−1=0

In the present example, the determination at S355 is affirmative and flow returns to S335 to add Row2 to the (still-empty) sample table. Flow then continues as described above with respect to Row2 and, upon reaching S355, continues to S360. FIG. 11 illustrates a vector of weights for each of the candidate rows after this second iteration of the present example.

The above cycle continues until all queries of the workload have been processed. At this point, a row of the source table is inserted into the sample table at S365 based on the weights (or votes) associated with each row_id. For example, a row_id associated with a largest positive weight may be selected as the row to add to the sample table. FIG. 12 illustrates sample table 1200 according to the present example. As shown, Row3 of table 420 was selected at S365 and now constitutes sample table 1200.

At S370, it is determined whether the sample table has reached a desired size. The desired size may be a preconfigured number of rows, a preconfigured percentage of the source table rows, dynamically determined based on resource availability, or determined in any other suitable manner. Flow continues to S375 if the sample table is not yet of the desired size.

The row weights are initialized at S375. FIG. 13 illustrates an initialized vector including the row weights according to some embodiments. Flow then returns to S305 to repeat the above process, for each query of the workload, but with respect to a sample table to which a new row has been added.

Accordingly, as shown in FIG. 14, query 410 is again executed on table 420 at S310 to generate result rows 430. Flow then continues as described above, except that the cardinality of the query is determined based on sample table 1200 at S320. Moreover, the candidate rows determined at S330 include only Row0 and Row5, since Row3 of result rows 430 is already a member of the sample table. FIG. 15 illustrates evaluation of query 410 at S340 against candidate sample 1500 including Row3 of sample table 1200 and candidate row Row0. Another row of table 420 is added to the sample table at S365 once all queries of the workload have been processed.

Flow proceeds to S380 once it is determined at S370 that the sample table is of the desired sample size. At S380, as described above, the sample table is used to estimate query cardinality for table 420. This estimation may then be used to determine a query execution plan for execution of the query.

Figure 16:
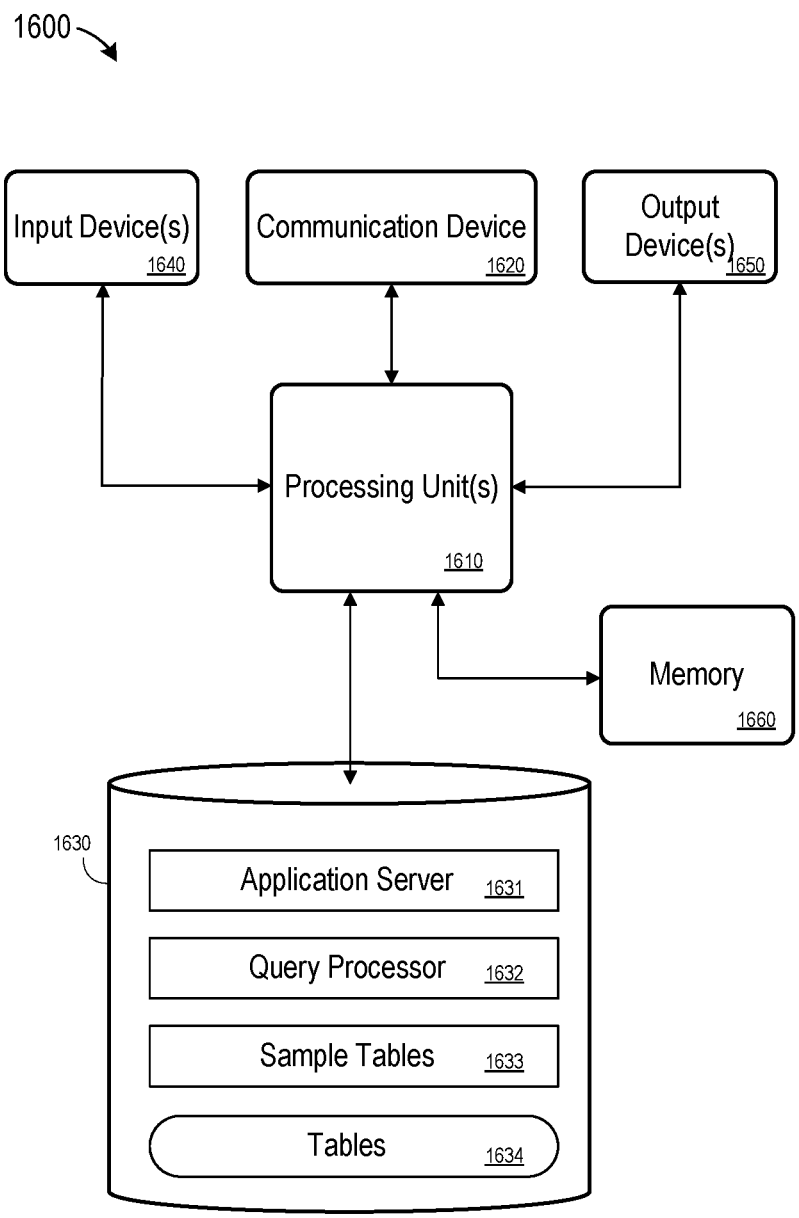
FIG. 16 is a block diagram of a database node according to some embodiments.

FIG. 16 is a block diagram of server node 1600 according to some embodiments. Server node 1600 may comprise a general-purpose computing apparatus and may execute program code to perform any of the functions described herein. Server node 1600 may comprise an implementation of server node 200 in some embodiments. Server node 1600 may include other unshown elements according to some embodiments.

Server node 1600 includes processing unit(s) 1610 operatively coupled to communication device 1620, data storage device 1630, one or more input devices 1640, one or more output devices 1650 and memory 1660. Communication device 1620 may facilitate communication with external devices, such as an external network or a data storage device. Input device(s) 1640 may comprise, for example, a keyboard, a keypad, a mouse or other pointing device, a microphone, knob or a switch, an infra-red (IR) port, a docking station, and/or a touch screen. Input device(s) 1640 may be used, for example, to enter information into apparatus 1600. Output device(s) 1650 may comprise, for example, a display (e.g., a display screen) a speaker, and/or a printer.

Data storage device 1630 may comprise any appropriate persistent storage device, including combinations of magnetic storage devices (e.g., magnetic tape, hard disk drives and flash memory), optical storage devices, Read Only Memory (ROM) devices, etc., while memory 1660 may comprise Random Access Memory (RAM).

Application server 1631 and query processor 1632 may each comprise program code executed by processor(s) 1610 to cause server 1600 to perform any one or more of the processes described herein. Such processes may include generation of one or more sample tables 1633 corresponding to one or more of tables 1634. Embodiments are not limited to execution of these processes by a single computing device. Data storage device 1630 may also store data and other program code for providing additional functionality and/or which are necessary for operation of server 1600, such as device drivers, operating system files, etc.

The foregoing diagrams represent logical architectures for describing processes according to some embodiments, and actual implementations may include more or different components arranged in other manners. Other topologies may be used in conjunction with other embodiments. Moreover, each component or device described herein may be implemented by any number of devices in communication via any number of other public and/or private networks. Two or more of such computing devices may be located remote from one another and may communicate with one another via any known manner of network(s) and/or a dedicated connection. Each component or device may comprise any number of hardware and/or software elements suitable to provide the functions described herein as well as any other functions. For example, any computing device used in an implementation some embodiments may include a processor to execute program code such that the computing device operates as described herein.

Embodiments described herein are solely for the purpose of illustration. Those in the art will recognize other embodiments may be practiced with modifications and alterations to that described above.

What is claimed is:

1. A system comprising:
    a memory storing processor-executable program code; and
    a processing unit to execute the processor-executable program code in order to cause the system to:
    determine a plurality of queries of a workload;
    determine a data source comprising a plurality of data rows; and
    determine a sample data source based on a cardinality of each of the plurality of queries with respect to the data source and an estimated cardinality of each of the plurality of queries with respect to the data source by:
        for each of the plurality of queries, determining a decrease in a cardinality estimation error associated with addition of each of candidate rows of the data source to the sample data source; and
        selecting a candidate row to add to the sample data source based on the determined decreases,
    wherein the estimated cardinality of a query with respect to the data source is determined based on the sample data source.

2. A system according to claim 1, the processing unit to execute the processor-executable program code in order to cause the system to:
    receive a runtime query on the data source;
    determine an estimated cardinality of the runtime query with respect to the data source based on the sample data source; and
    determine a query execution plan for the runtime query based on the estimated cardinality of the runtime query with respect to the data source.

3. A system according to claim 1, wherein each of the plurality of queries is associated with one or more predicates, and
    wherein the candidate rows associated each one of the plurality of queries are rows of the data source selected by the one or more predicates of the query.

4. A system according to claim 3, wherein determination, for one of the plurality of queries, of a decrease in a cardinality estimation error associated with addition of a candidate row comprises:
    determination of a true cardinality of the query with respect to the data source by execution of the query on the data source;
    determination of a current estimated cardinality of the query with respect to the data source by execution of the query on the sample data source not including the candidate row;
    determination of a current cardinality estimation error based on the true cardinality and the current estimated cardinality;
    determination of a new estimated cardinality of the query with respect to the data source by execution of the query on the sample data source including the candidate row;
    determination of a new cardinality estimation error based on the true cardinality and the new estimated cardinality; and
    determination of the decrease in the cardinality estimation error based on the current cardinality estimation error and the new cardinality estimation error.

5. A system according to claim 1, wherein determination, for one of the plurality of queries, of a decrease in a cardinality estimation error associated with addition of a candidate row comprises:
    determination of a true cardinality of the query with respect to the data source by execution of the query on the data source;
    determination of a current estimated cardinality of the query with respect to the data source by execution of the query on the sample data source not including the candidate row;
    determination of a current cardinality estimation error based on the true cardinality and the current estimated cardinality;

determination of a new estimated cardinality of the query with respect to the data source by execution of the query on the sample data source including the candidate row;

determination of a new cardinality estimation error based on the true cardinality and the new estimated cardinality; and determination of the decrease in the cardinality estimation error based on the current cardinality estimation error and the new cardinality estimation error.

6. A computer-implemented method, comprising:

determining a plurality of queries;

determining a data source comprising a plurality of data rows; and determining a sample data source comprising a plurality of the plurality of data rows based on a cardinality of each of the plurality of queries with respect to the data source and an estimated cardinality of each of the plurality of queries with respect to the data source by:

for each of the plurality of queries, determining a decrease in a cardinality estimation error associated with addition of each of candidate rows of the data source to the sample data source; and selecting a candidate row to add to the sample data source based on the determined decreases, wherein the estimated cardinality of a query with respect to the data source is determined based on data rows of the sample data source.

7. A method according to claim 6, further comprising:

receiving a runtime query on the data source;

determining an estimated cardinality of the runtime query with respect to the data source based on the sample data source; and determining a query execution plan for the runtime query based on the estimated cardinality of the runtime query with respect to the data source.

8. A method according to claim 6, wherein each of the plurality of queries is associated with one or more predicates, and wherein the candidate rows associated each one of the plurality of queries are rows of the data source selected by the one or more predicates of the query.

9. A method according to claim 8, wherein determining, for one of the plurality of queries, of a decrease in a cardinality estimation error associated with addition of a candidate row comprises:

determining a true cardinality of the query with respect to the data source by execution of the query on the data source;

determining a current estimated cardinality of the query with respect to the data source by execution of the query on the sample data source not including the candidate row;

determining a current cardinality estimation error based on the true cardinality and the current estimated cardinality;

determining a new estimated cardinality of the query with respect to the data source by execution of the query on the sample data source including the candidate row;

determining a new cardinality estimation error based on the true cardinality and the new estimated cardinality; and determining the decrease in the cardinality estimation error based on the current cardinality estimation error and the new cardinality estimation error.

10. A method according to claim 6, wherein determining, for one of the plurality of queries, of a decrease in a cardinality estimation error associated with addition of a candidate row comprises:

determining a true cardinality of the query with respect to the data source by execution of the query on the data source;

determining a current estimated cardinality of the query with respect to the data source by execution of the query on the sample data source not including the candidate row;

determining a current cardinality estimation error based on the true cardinality and the current estimated cardinality;

determining a new estimated cardinality of the query with respect to the data source by execution of the query on the sample data source including the candidate row;

determining a new cardinality estimation error based on the true cardinality and the new estimated cardinality; and determining the decrease in the cardinality estimation error based on the current cardinality estimation error and the new cardinality estimation error.

11. A non-transitory computer-readable medium storing program code executable by a processing unit to:

determine a plurality of queries of a workload; and determine a sample data source based on a cardinality of each of the plurality of queries with respect to a data source comprising a plurality of data rows and an estimated cardinality of each of the plurality of queries with respect to the data source by:

for each of the plurality of queries, determination of a decrease in a cardinality estimation error associated with addition of each of candidate rows of the data source to the sample data source; and selection of a candidate row to add to the sample data source based on the determined decreases, wherein the estimated cardinality of a query with respect to the data source is determined based on the sample data source.

12. A medium according to claim 11, the program code executable by a processing unit to:

receive a runtime query on the data source;

determine an estimated cardinality of the runtime query with respect to the data source based on the sample data source; and determine a query execution plan for the runtime query based on the estimated cardinality of the runtime query with respect to the data source.

13. A medium according to claim 11, wherein each of the plurality of queries is associated with one or more predicates, and wherein the candidate rows associated each one of the plurality of queries are rows of the data source selected by the one or more predicates of the query.

14. A medium according to claim 13, wherein determination, for one of the plurality of queries, of a decrease in a cardinality estimation error associated with addition of a candidate row comprises:

determination of a true cardinality of the query with respect to the data source by execution of the query on the data source;

determination of a current estimated cardinality of the query with respect to the data source by execution of the query on the sample data source not including the candidate row;

determination of a current cardinality estimation error based on the true cardinality and the current estimated cardinality;

determination of a new estimated cardinality of the query with respect to the data source by execution of the query on the sample data source including the candidate row;

determination of a new cardinality estimation error based on the true cardinality and the new estimated cardinality; and determination of the decrease in the cardinality estimation error based on the current cardinality estimation error and the new cardinality estimation error.

15. A medium according to claim 11, wherein determination, for one of the plurality of queries, of a decrease in a cardinality estimation error associated with addition of a candidate row comprises:

determination of a true cardinality of the query with respect to the data source by execution of the query on the data source;

determination of a current estimated cardinality of the query with respect to the data source by execution of the query on the sample data source not including the candidate row;

determination of a current cardinality estimation error based on the true cardinality and the current estimated cardinality;

determination of a new estimated cardinality of the query with respect to the data source by execution of the query on the sample data source including the candidate row;

determination of a new cardinality estimation error based on the true cardinality and the new estimated cardinality; and determination of the decrease in the cardinality estimation error based on the current cardinality estimation error and the new cardinality estimation error.

* * * * *